April 9, 1968     D. C. VAN SICKLE     3,376,908
AUTOMATIC CONTOUR CUTTING

Filed Dec. 2, 1965     3 Sheets-Sheet 1

INVENTOR.
DON C. VAN SICKLE
BY Fulwider, Patton, Rieber, Lee, and Utecht
ATTORNEYS

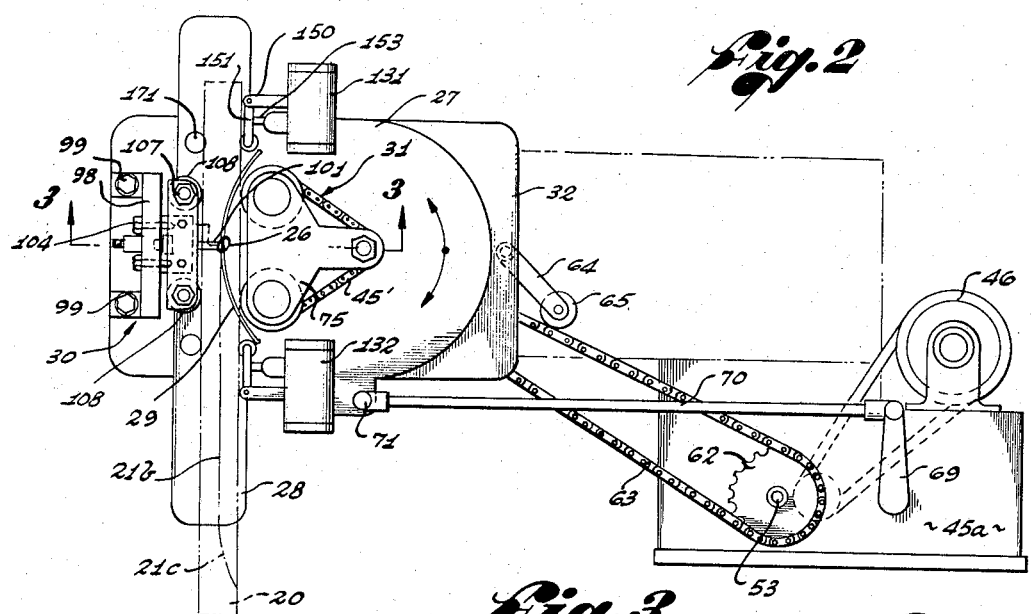
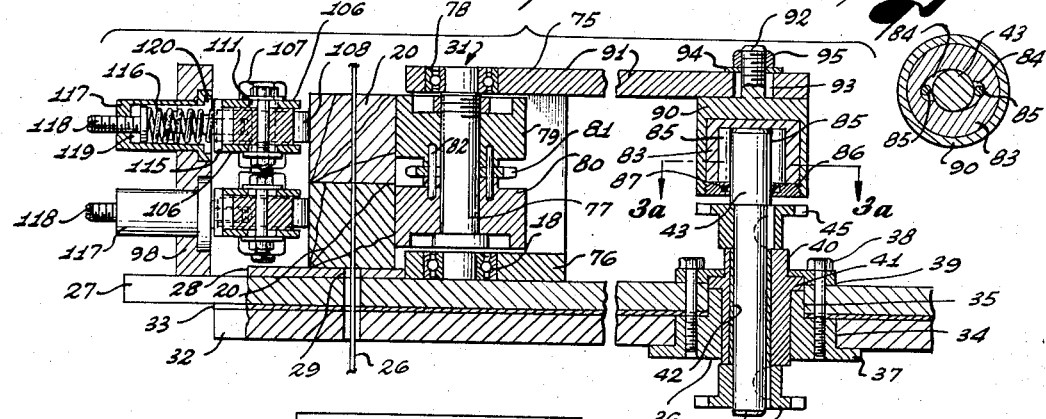
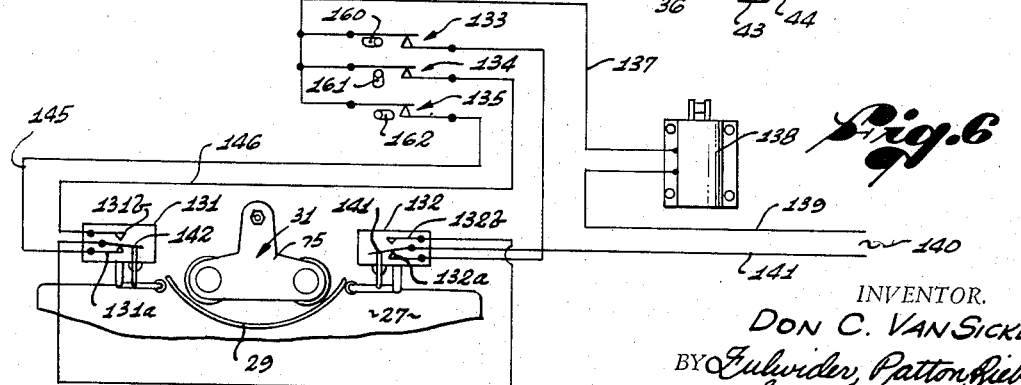

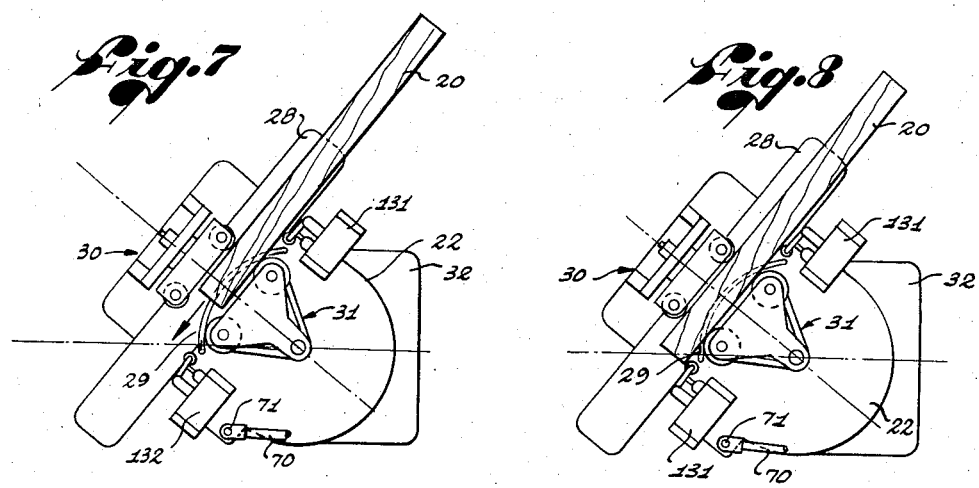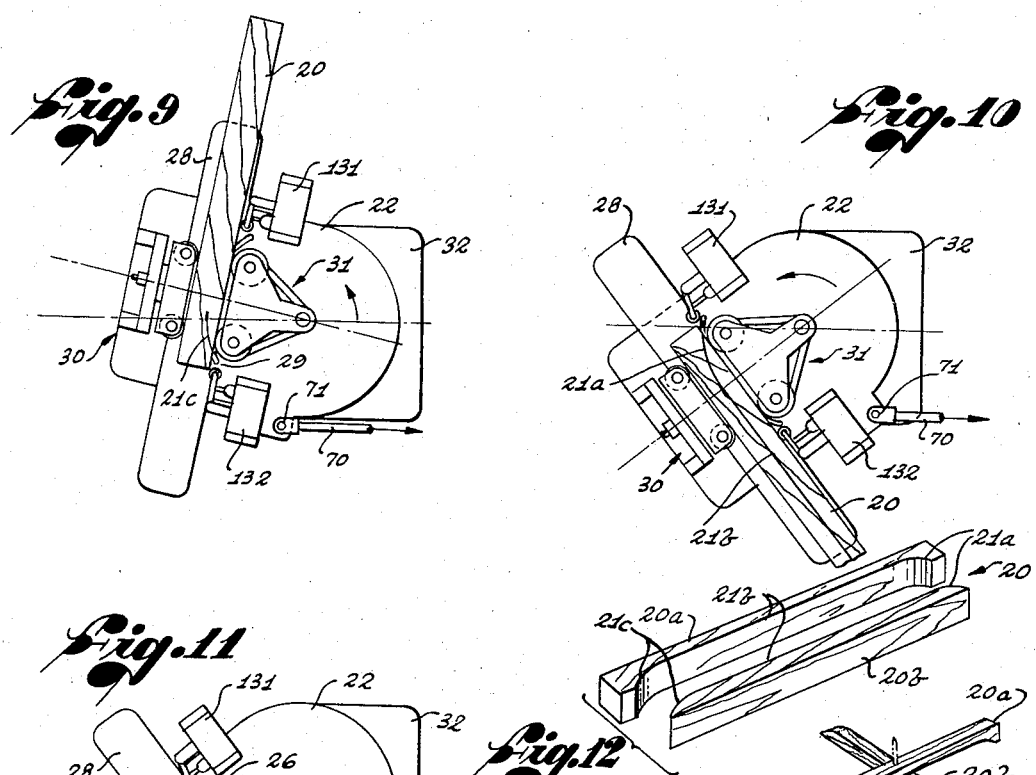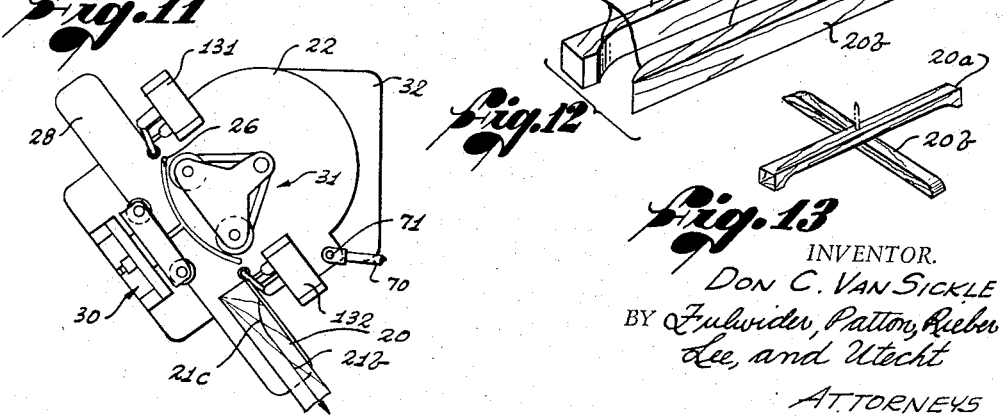

United States Patent Office 3,376,908
Patented Apr. 9, 1968

3,376,908
AUTOMATIC CONTOUR CUTTING
Don C. Van Sickle, 321 Primrose Ave.,
Redlands, Calif. 92373
Filed Dec. 2, 1965, Ser. No. 511,035
15 Claims. (Cl. 144—242)

ABSTRACT OF THE DISCLOSURE

A work feeding apparatus for power tools of the type having a cutting tool operating in a fixed zone, the apparatus having angular and linear feeds automatically operable in a sequence to effect contour cutting of the workpiece in contours including either or both of straight lines and curved edges, the automatic sequence of operation of the apparatus being a function of the feeding of the workpiece through the tool zone and through the feeding devices.

---

The present invention relates to power tools of the type in which the tool operates in a fixed zone and the work is fed into the tool. The invention is of general utility with respect to contour cutting machines of this class but is of special utility in band saws for wood-working.

An object of this invention is to provide a contour cutting machine that automatically feeds the work into the tool in a sequence of linear and arcuate movements of the work, the sequence being automatically carried out by the passage of the work itself through the machine rather than by the use of templates or other types of master pattern controls.

Another important object is to provide a machine which will accurately reproduce a plurality of like contour cut shapes automatically from a like plurality of like work pieces and which, in doing so, will automatically compensate for or allow a generous tolerance for variations in dimensions of the ostensibly similar workpieces. This arrangement not only permits the cutting of different lots of workpieces without having to adjust the automatic controls of the machine but has the further advantage of producing interchangeable parts so that any cut piece will fit complementarily to any opposite piece cut from the same lot, even though not cut from the same workpiece.

The invention has further important objects and advantages in being able to handle workpieces of any length without limitation as to maximum length and in being adaptable to any practical minimum length merely by changing the relative positions of the control points relative to the cutting tool. Further, the invention provides an automatic cutting machine which can handle a plurality of elongated objects for simultaneous cutting of identical contours therein.

The foregoing and other objects and advantages of the invention will be apparent to those skilled in the art from the following description of one presently preferred embodiment thereof, when taken in conjunction with the annexed drawings.

FIGURE 2 is a top plan view of the attachment shown in FIGURE 1, the band saw being indicated schematically by the dotted outline for purposes of clarity of illustration of the attachment;

FIGURE 3 is a vertical sectional view on the line 3—3 of FIGURE 2;

FIGURE 3a is a horizontal sectional view on the line 3a—3a of FIGURE 3;

FIGURE 6 is a schematic diagram of a suitable control system for the machine;

FIGURES 7 through 11 are somewhat schematic plan views, similar to FIGURE 2, showing the sequence of movements of the work and its supporting carriage in a cycle of operation;

FIGURE 12 is a perspective view of a workpiece after having been severed into two pieces by the machine; and FIGURE 13 is a perspective view illustrating the two pieces of FIGURE 12 operatively associated as a tree stand.

The illustrated embodiment of the invention is specifically adapted for cutting elongated blocks of wood 20 into two complementary pieces 20a and 20b along a contour line 21, as indicated in FIGURE 12, to make the well known form of tree stand. For the purposes of this product, the contour line 21 includes an intermediate straight line portion 21b terminating at opposite ends in radius cuts 21a, and 21c. However, it is to be understood that the invention is not limited to making contour cuts of this particular configuration but may be adapted for making combinations of either inside or outside radius cuts with straight line cuts.

Figure 1:
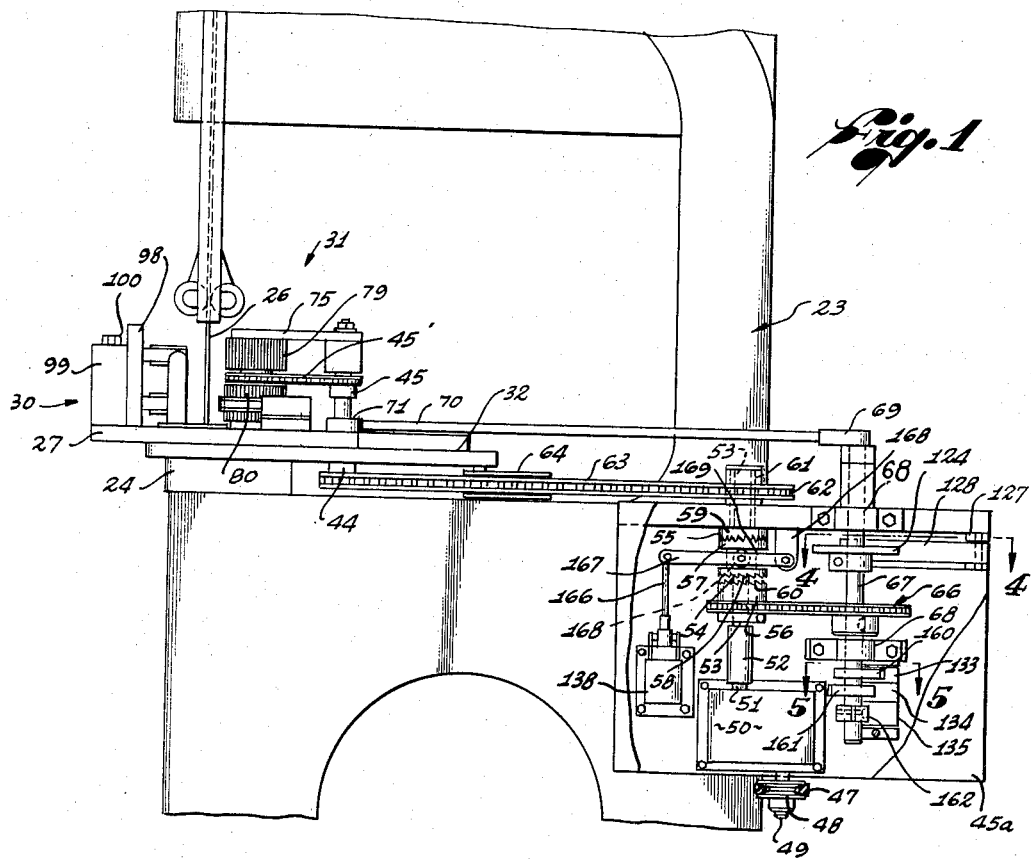
FIGURE 1 is a side elevational view, with parts cut away, of an embodiment of the invention, particularly adapted for use as an attachment to a saw.

While the invention may be built integrally with the power tool, it may also take the form of the attachment illustrated in FIGURE 1, wherein it is specifically adapted for use with a conventional band saw 23. The band saw has the usual generally C-shaped hollow frame and includes a horizontally disposed work table 24 formed with a vertically disposed slot 25 through which an endless saw blade 26 passes in its working run, normal to the table 24. It is, of course, to be understood that the endless blade 26 is power-driven and as the band saw is conventional, further description thereof is unnecessary.

The general arrangement of the invention can be seen in FIGURES 2 and 3. Thus, the attachment includes a horizontally disposed and pivotally mounted feed carriage 27. An elongated plate 28 is secured to the top of the feed carriage 27 for swinging movement therewith and is formed with an arcuate slot 29 in registration with similar slots formed in the underlying structure of the attachment. Thus, the carriage 27 and plate 28 can be swung as a unit relative to the saw blade 26, within the limits of the arcuate slot 29.

On one side of the plate 28, the feed carriage 27 is equipped with a pressure roller mechanism 30 in confronting relation to a feed roll mechanism 31, disposed on the opposite side of the plate 28. These sets of rollers and rolls comprise a linear feed mechanism for the blocks of wood 20. As will be apparent from an examination of FIGURES 7 through 11, the workpieces can be advanced into the blade 26 either by angular movement of the feed carriage 27 to effect arcuate cutting or by operation of the feed roll mechanism 31 to effect straight line cutting. The arrangement is such that the power means of the attachment is connected to either the feed roll mechanism 31 or the feed carriage 27 by a control means that is responsive to the position of the blocks of wood 20, both with respect to the feed carriage 27 and the angular position of the workpieces and feed carriage with respect to their supporting structure.

More specifically, the attachment is provided with a carriage base plate 32 that is adapted to be secured on top of the band saw work table 24. This base plate may be covered with a shim or liner 33 coated with a suitable lubricant to accommodate angular reciprocation of the feed carriage 27. For pivotally interconnecting the feed carriage 27 and base plate 32, the latter is formed with a hole 34 that is coaxially aligned with a smaller diameter hole 35 formed in the feed carriage 27. A collar 36 is coaxially seated in the bores 34 and 35, having a stepped external configuration adapted for mating reception within the holes 34 and 35, the larger diameter portion being adapted for rotational bearing within the hole 34 of the base plate 32. The collar 36 is provided with a radially outwardly extending flange 37 at its lower end for bearing against the underside of the plate 32 and, by means of a plurality of bolts 38, is rigidly interconnected to a clamping ring 39 that bears against the upper surface of the feed carriage 27.

The collar 36, bolts 38, clamping ring 39 and feed carriage 27 are thus keyed together for angular co-movement with respect to the fixed-in-place base plate 32. Additionally, this pivotal interconnection of the feed carriage 27 and base plate 32 also serves as a bearing in the transmission of power to the feed roll mechanism 31. To this end, the collar 36 coaxially receives a sleeve 40 formed with a circumferentially extending external flange 41 adapted to be clamped between the ring 39 and the inner end of the collar 36. The bore through the sleeve 40 has its axis disposed eccentrically with respect to the axis of the sleeve and contains a bushing 42 to serve as a bearing for a shaft 43 extending therethrough. The lower end of the shaft 43 protrudes out of the sleeve 40 and has a chain sprocket 44 keyed thereto and, in like fashion, the upper end of the shaft 43 protrudes upwardly beyond the sleeve 40 and has a chain sprocket 45 keyed thereto. Because of the eccentric disposition of the shaft 43 with respect to the rotational axis of the sleeve 40, the tension of a chain 45' interconnecting the upper chain sprocket 45 to the feed roll mechanism can be adjusted merely by loosening the clamping ring 39 and thereafter turning the sleeve 40 until a desired tension of the chain is achieved, after which the clamping ring 39 is again secured.

Referring to FIGURE 2, the device includes an auxiliary housing 45' that is secured by any convenient means to the band saw 23 and serves to support an electrical motor 46 which provides the power for both actuation of the feed roll mechanism 31 or angular reciprocation of the feed carriage 27. Referring to FIGURE 1, the output shaft of the motor 46 is drivingly interconnected by an endless belt 47 to a pulley 48 that drives an input shaft 49 of a gear reduction mechanism 50 mounted within the housing 45'. An output shaft 51 protrudes upwardly from the reduction mechanism 50 and, by means of a coaxial coupler 52, is drivingly interconnected to a main power shaft 53 that extends vertically upwardly through the housing 45' to protrude from the upper wall of the housing. A shift clutch 54 is drivingly connected to the power shaft 53, for example, by a spline connection so as to be axially shiftable with respect to the shaft and its constant torque may be utilized either for driving the feed roll mechanism 31 or effecting angular reciprocation of the feed carriage 27.

Above the shift clutch 54, the shaft 53 idly mounts a feed roll clutch 55 and below the shift clutch 54, the shaft idly mounts an index clutch 56. The opposite ends of the shift clutch 54 are formed with sets of ratchet teeth 57 and 58, adapted for meshing with either ratchet teeth 59 of the feed roll clutch 55 or set of ratchet teeth 60 of the index clutch 56. In FIGURE 1, the shift clutch 54 is shown in the raised position with its set of ratchet teeth 57 engaged with the set of ratchet teeth 59 of the feed roll clutch 55. In this position of the shift clutch, the torque of the shift clutch is transmitted through a hollow axle shaft 61 of the feed roll clutch 55 (that is sleeved over the main shaft 53) to be transmitted to a chain sprocket 62, keyed to the axle shaft 61, thence to be transmitted via an endless chain 63 to the chain sprocket 44. In order to adjust the tension of the chain 63, the base plate 32, at its rear end, pivotally mounts a lever 64 whose free end carries an idler sprocket 65, the arm 64 being biased by a spring (not shown) for yieldably maintaining the idler sprocket 65 in engagement with the chain 63.

When the shift clutch 54 is lowered from its position of FIGURE 1, its other set of teeth 68 engages the set of ratchet teeth 60 of the index clutch 56. The torque of the shift clutch 54 is then transmitted via a chain and sprocket means 66 to a countershaft 67 that is journaled in appropriate pillow blocks 68 on the housing 45a. The upper end of the countershaft 67 protrudes from the housing 45a and is keyed to a crank arm 69 pivotally interconnected to a link 70 whose other end is pivotally connected to the feed carriage 27, at 71, by means of gudgeon secured on top of the feed carriage at one side thereof. As can be seen from an examination of FIGURES 7 through 11, the linkage arrangement is adapted to translate each complete revolution of the crank arm 69 into one cycle of angular reciprocation of the feed carriage 27.

The feed roll mechanism 31 includes a generally T-shaped top plate 75 and a generally rectangularly shaped bottom plate 76. The bottom plate 76 rests on top of the feed carriage 27 with its forward edge in closely confronting relationship to the adjacent edge of the elongated plate 28. The bottom plate 76 and top plate 75 are held in assembled relationship by a spacer block rigidly secured thereto to give the mechanism torsional rigidity and mount a spaced pair of vertically disposed axle shafts 77, each of the shafts at its opposite ends having a ball bearing connection 78 to the plates 75 and 76. Each of these shafts 77 coaxially supports a pair of externally toothed feed rolls 79 and 80 between whose confronting ends a chain sprocket 81 is coaxially journaled on the shaft 77. A plurality of drive pins 82 serves to drivingly interconnect the chain sprocket 81 and pair of rolls 79 and 80, whereby the chain 45' from the chain sprocket 45, which is also drivingly interconnected to the chain sprocket 81, serves to drive the two pairs of feed rolls 79 and 80. As indicated in FIGURE 2, the endless chain 45' engages the chain sprockets 81 of both pairs of feed rolls and the chain sprocket 45 of the shaft 43, the chain thus describing a substantially triangular path. As indicated in FIGURE 3, the two sets of double feed rolls 79 and 80 are adapted for handling a pair of the stacked blocks of wood 20.

The feed roll mechanism 31 is both detachably and adjustably connected to the attachment for the purpose of permitting interchangeability of feed roll mechanisms of different sizes or for disassembly of the attachment.

The feed rolls 79 and 80 are maintained in the proper relationship with the elongated plate 28 by the connection of the top plate 75 to an upward extension of the shaft 43, best seen in FIGURE 3. There, it will be seen that the shaft 43 protrudes upwardly beyond the chain sprocket 45 to be capped by a generally cup-shaped clutch housing 83. As shown in FIGURE 3a, the clutch member 83 is formed with a pair of diametrically disposed pockets 84 whose surfaces are curves of gradually varying radius defining cams. A pair of rollers 85 are disposed in the pair of cam surface pockets 84 and are held in place by a cap ring, closing the lower end of the clutch member 83, the cap ring being provided with a wiper ring 87 to retain lubricant within the housing. This camming arrangement provides a "back stopping" feature preventing retrograde movement of the chain drive to the feed rolls and holding the work against shifting on the plate 28, whose function and mode of operation will be described later.

The clutch member 83 is received within another cup-shaped housing member 90, whose lower end is interiorly tapped to threadedly receive the ring cap 86, the cap being tightened sufficiently to hold the clutch member 83 tightly in place within the housing 90. The generally T-shaped top member 75 of the feed roll mechanism 31 has a stem portion 91 whose rear end rests on top of the housing 90. A stud 92 is formed integrally with the housing 90, coaxially surmounting the housing to protrude through a hole 93 formed in the rear end of the stem 91. As is shown in FIGURE 3, the stud 92 has ample clearance in the hole 93 of the stem 91 whereby the feed roll mechanism and the housing 90 can be shifted relative to one another. In order to clamp the feed roll mechanism in the desired position, a washer 94 is slipped over the stud 92 to bear against the upper surface of the stem 91 and a nut 95 is provided for threaded engagement with the stud 92, whereby the stem 91 can be clamped securely against the top of the housing 90.

It will be recalled that the shaft 43 is eccentrically located with respect to the collar 36 for purposes of adjusting the tension in the chain 45'. Consequently, the clutch mechanism on top of the shaft is also shifted eccentrically by any adjustment of the shaft 43. Because of the slot 93 and the stem 91, the clutch mechanism can be maintained in the proper coaxial relationship to the shaft 43 without affecting the desired position of the feed rolls 79 and 80 relative to the work pieces which will pass over the plate 28.

As has been stated, the work is fed into the blade 26 either by angular movement of the feed carriage 27 or by rotation of the feed rolls 79 and 80. During angular movement of the feed carriage 27, the feed rolls 79 and 80, not having any power applied thereto, still serve to hold the work firmly, along with the pressure roll mechanism 30, and to feed it firmly into the blade 26 because of the presence of the clutch mechanism of FIGURE 3a, which prevents retrograde movement of the feed rolls 79 and 80. This feature is of particular importance when the blade 26 is just entering the work as in FIGURE 8 and when the blade is just leaving the work, as in FIGURE 10. The manner in which the clutch mechanism accomplishes this result will be apparent from an examination of FIGURE 3a, in which the shaft 43 turns in a counter-clockwise direction when the chain and sprocket means for driving the feed rolls 79 and 80 is active. Now, upon the power being disconnected from the feed roll drive, during angular movement of the feed carriage 27, the feed rolls 79 and 80, in contact with the work, will tend to be rotated in a clockwise direction, thus exerting a counter-clockwise tendency on the shaft 43. As a result, the pair of cam rollers 85 in the cam pockets 84 are wedged between the walls of the cam pockets and the shaft 43. As the clutch member 83 and housing 90 are held against rotation by the feed roll mechanism through the stem 91, the shaft 43 is locked against any further clockwise movement. In this connection, it will be observed that the bottom plate 76 of the feed roll mechanism has its forward edge in close proximity to the confronting edge of the elongated plate 28, thus closely limiting the angular movement of the feed roll mechanism.

As the illustrated embodiment of the invention is adapted to take two pieces 20 simultaneously, the pressure roll mechanism 30 is provided with two sets of pressure rolls, upper and lower, for respective cooperation with the upper feed rolls 79 and lower feed rolls 80 of the feed roll mechanism. The two sets of pressure rolls are identical in construction and mode of operation and are mounted on a common support frame and, therefore, but one set will be described in detail.

Support for the pressure roll mechanism 30 is provided by a rectangular vertically disposed plate 98 that rests on top of the feed carriage 27, generally paralleling the elongated plate 28. On its forward surface and at opposite ends of the plate 98, it is rigidly secured, as by welding, to a pair of upright standard members 99, each of which is vertically bored to receive a bolt 100, the bolt extending through the standards 99 to threadedly engage tapped bores (not shown) form in aligned locations in the feed carriage 27. The entire feed roll mechanism can be removed merely by removal of the bolts 100. A slot 101 that opens into the forward edge of the feed table 27 is thus opened to passage of the blade 26, the slot 101 extending along longitudinal center line of the attachment to intercept the arcuate slot 29 of the attachment.

Each set of pressure rolls is supported for limited slidable reciprocation towards and away from the workpieces and is normally spring-biased away from the supporting plate 98. The slide support takes the form of a generally U-shaped member 103 that is horizontally disposed with its opposite legs bearing against the rear face of the plate 98. Tapped bores are formed in the legs of the U-shaped member 103 in registration with holes through the member 98 and a pair of bolts 104 pass through the holes of the member 98 to threadedly engage the tapped bores in the U-shaped member 103 to clamp the member tightly in place.

Slidably engaging the top and bottom surfaces of the U-shaped member 103 are a pair of rectangular plates 106 whose opposite ends both are provided with a means 107 intercepting both plates and each serving to journal a pressure roll 108. The U-shaped member 103 is formed with a spaced pair of vertically extending bores receiving a pair of bolts 110 and the opposite ends of each of these bolts extend through slots 111 formed in the plates 106. While the bolts 110 have a close fit in the bores formed in the U-shaped member 103, the slots 111 are elongated in a direction normal to the plate 98, while of a width to loosely slidably embrace the ends of the bolts 110. The feed rolls 108 are thus constrained for movement towards and away from the work pieces 20 while being loosely restrained against shifting in a direction paralleling the work pieces.

The pair of rollers 108 of each set are normally biased into the work by a spring means located in the mid portion of the plates 106. With this arrangement, the pair of rollers 108 are, in effect, fulcrumed midway there between so that both rollers will simultaneously engage the confronting surface of the workpiece, irrespective of variations in the width of the workpiece. For this purpose, the pair of plates 106 on their forward edges and midway between their ends are rigidly interconnected by a member 115 of circular plan configuration which provides a seat for one end of a spring 116. The support plate 98 mounts a generally cylindrical spring housing 117 which is coaxially aligned with the member 115 and protrudes from the front face of the support member 98. The forward end of the spring housing 117 is tapped to receive a set screw 118, whose inner end carries a disc 119 against which the other end of the spring 116 bears. As is evident, the force exerted by the spring 116 can be adjusted by adjustment of the set screw 118. The rear end of the housing 117 is provided with a counter bore 120, adapted to seat the member 115 and so to limit the extent to which the presure rolls can be biased away from the work.

Figure 4:
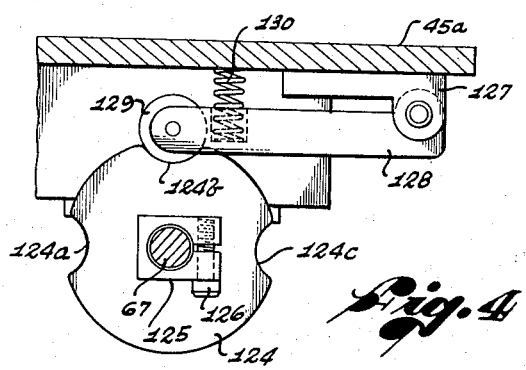
FIGURE 4 is a horizontal sectional view, of the line 4—4 of FIGURE 1, showing a portion of the indexing means for the feed carriage of the device.

FIGURES 7, 2, and 11 illustrate three different angular positions of the feed carriage 27 relative to the blade 26, representing phases of the cycle in which the feed roll mechanism 31 is operative, the feed carriage 27 being disengaged from the power source. In order to yieldably maintain the feed carriage 27 in each of these three angular positions, the linkage system for turning the carriage is interconnected to an indexing means contained within the control housing 45'. As is shown in FIGURES 1 and 4, the indexing means may conveniently take the form of a circular plate 124 that is centrally bored and is provided with a split collar 125 and clamping screw 126, whereby the plate is drivably secured to the countershaft 67. On an adjacent wall portion of the housing 45', there is a bracket 127 pivotally mounting one end of an index lock lever 128, whose free end mounts an index lock roller 129 that is disposed in substantially co-planar relationship with the index lock plate 124. A coil spring 130 is interposed between the lever 128 and an adjacent wall portion of the housing 45' to forcefully bias the roller 129 into engagement with the periphery of the plate 124.

The index plate 124 has three detents, 124a, 124b, and 124c, formed in its periphery, the detents taking the form of shallow curved depressions of a radius substantially conforming to the radius of the lock roller 129. These detents are angularly spaced apart distances corresponding to the three rest positions of the feed carriage 27. Thus, at the beginning of the cycle, as represented by FIGURE 7, the roller 129 is forcefully but yieldably engaged with the detent 124a, as the work piece 20 is initially being fed onto the plate 28. During the straight-line cutting phase of the cycle, as in FIGURE 2, the roller 129 forcefully engages the detent 124b. After the final radius cut, during the phase in which the work piece is being ejected from the plate 28, as in FIGURE 11, the roller 129 engages the detent 124c. The spring 130 should be of sufficient strength to maintain the feed carriage 27 in each of these three positions, especially during the straight cutting cycle when stresses tending to induce rotation of the feed carriage 27 are highest. At the same time, the force of the spring 130 must be adapted to yield when torque is applied to the countershaft 67 to allow the roller 129 to be cammed out of indexing engagement with the plate 124 by the detents.

While the feed carriage 27 and feed roll mechanism 31 may be controlled and powered by electrical, hydraulic or pneumatic means, or by combinations thereof, the presently preferred embodiment of the invention utilizes an electrical control and power system such as is shown schematically in FIGURE 6. The system includes a pair of series connected switches 131 and 132 and a set of normally closed switches 133, 134 and 135, connected in parallel. The switches 133, 134 and 135 are connected by a conductor 137 to one terminal of a solenoid 138, whose other terminal is connected by a conductor 139 to a source of electrical energy 140. A conductor 141 interconnects the source 140 to a double throw switch member 141 of the switch 132 for alternately contacting contacts 132a or 132b of the switch. The switch 131 also has a double throw switch member 142 for contact with either of contacts 131a or 131b and is connected by a conductor 143 to the contact 132b of switch 132. The other contact 132a is connected by a conductor 144 to the normally closed switch 133 and, similarly, the contacts 131a and 131b of the switch 131 are connected by conductors 145 and 146, respectively to the normally closed switches 135 and 134, respectively.

Referring now to FIGURE 2, it will be observed that the switch 131 is mounted on the feed carriage 27 adjacent the entrance end of the elongated plate 28. A bracket arm 150 extends forwardly from the switch 131 and at its forward end, pivotally supports a lever 151 whose free end carries a roller 152. A link 153 interconnects the lever 151 to the switch member 142 and a spring means (not shown) is provided to normally bias the switch member 142 into contact with the contact 131a. The switch 132 is mounted adjacent the exit end of the elongated plate 28 on the feed carriage 27 and is similarly provided with a bracket arm 150, lever 151, roller 152 and link 153 and is also spring-biased to have its switch member 141 normally in contact with the contact 132a. The rollers 152 are interposed in the path of the workpieces which will pass over the plate 28 to be sequentially contacted by the workpieces 20, whereby the switch members 142 and 141 are sequentially operated.

Figure 5:
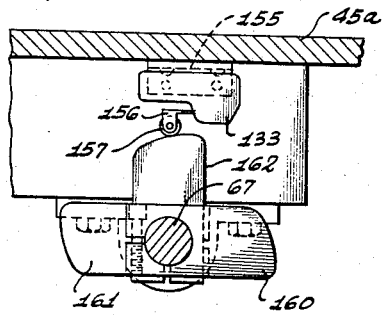
FIGURE 5 is a horizontal sectional view, of the line 5—5 of FIGURE 1, showing a portion of the control means for feeding the work angularly.

The normally closed switches 133, 134 and 135 are all disposed within the housing 45', arranged vertically in substantial parallelism with the countershaft 67, as shown in FIGURE 1. Referring to FIGURE 5, the switches may be mounted on brackets 155 and each switch is provided with a normally outwardly biased arm 156 that carries a roller 157. The countershaft 67 has three vertically spaced apart and horizontally disposed switch cams 160, 161 and 162, secured thereto, disposed in co-planar relationship to the rollers 157 of the limit switches 133, 134 and 135, respectively. The angular spacing between the cam ends of the switch cams 160, 161 and 162 is the same as the angular spacing between the detents 124a, b, and c of the index lock plate 124, whereby the circuits corresponding to these limit switches will be opened by the corresponding switch cam at a time when the index lock roller 129 falls into registration with one of the detents of the index lock plate 124.

The solenoid 138 is of the sucking type, having a plunger that is normally spring-biased outwardly and is provided with a bracket 165 for connection to one end of a rod 166 which is shifted axially as the electromagnet is energized and de-energized. The outer end of the rod 166 is pivotally connected to a lever 167 whose other end is pivotally connected to a bracket 168 secured to an interior wall of the housing 45a. The lever 167 comprises a spaced pair of arms, each of which arms on its inner face mounts a roller 168 in close rolling contact with a pair of opposed confronting and radially disposed opposite sides of a circumferential groove 169 formed in the center of the shift clutch 54. Accordingly, because of the spring means opposing the plunger of the solenoid 138, the shift clutch 54 is normally biased into the upper position of FIGURE 1, wherein its set of ratchet teeth 57 are meshed with the ratchet teeth 59 of the feed clutch 55. When the solenoid 138 is energized, the spring force is overcome as the plunger is sucked into the solenoid, whereby the lever 167 is pivoted downwardly to drive the shift clutch set of ratchet teeth 58 into driving engagement with the set of ratchet teeth 60 of the index clutch 56. In this manner, the torque of the main power shaft 53 is alternately shifted between the feed roll clutch 55 and the index clutch 56 for accomplishing either rotation of the feed rolls 79 and 80 or angular movements of the feed carriage 27.

At the start of a cycle of operation, the feed carriage 27 is in the angularly indexed position illustrated in FIGURE 7. Before the blocks of wood 20 are fed into the entrance end of the elongated plate 28, neither of the switch rollers 156 of the switches 131 and 132 has been depressed. Although the switch member 141 is on the contact 132a, the solenoid 138 is not energized as the switch cam 160 at the same time holds the switch 133 open. Accordingly, the shift clutch 54 is in engagement with the feed clutch 55, whereby the feed rolls 79 and 80 are turning.

As the work 20 is placed on the elongated table 28, it is guided between the switch roller of the switch 131 and a confronting guide post 171 until the leading end of the work is engaged by the feed rolls. As the work passes the switch 131, the switch member 142 is moved onto the contact 131b, but as the switch 131 is in series with the contact 132b, which is open, the solenoid 138 is not energized and the feed rolls 79 and 80 continue advancing the work toward the saw blade 26.

Referring to FIGURE 8, when the leading end of the work 20 depresses the switch roller 152 of the switch 132, the switch member 141 closes onto the contact 132b, whereby the circuit to the limit switch 134 is completed and the solenoid is energized. As a result, the shift clutch 54 moves from the feed clutch 55 to the index clutch 56, whereby the feed rolls 79 and 80 are stopped and the feed carriage 27 undergoes angular movement to feed the work 20 for making the first radius cut 21c in the work. As the countershaft 67 turns, the switch cams 160, 161 and 162 carried thereby are turned until the cam 166 contacts the limit switch 134 to open the switch. Thereupon, the circuit to the solenoid 138 is de-energized and the shift clutch 54 is spring-biased back into driving engagement with the feed clutch 55 to reactivate the feed rolls 79 and 80. Simultaneously, the index roller 129 is in registration with and is forced into the detent 124b of the index plate 124 to now securely hold the feed carriage 27 in the position of FIGURE 2, for making the straight cut 21b in the work.

Both of the switches 131 and 132 now being engaged with the work 20, the straight cut 21b is terminated and the second radius cut 21a commences when the trailing end of the work 20 leaves the roller of the switch 131. The switch member 142 now comes back onto the contact 131a, whereby the circuit to the solenoid 138 through the limit switch 135 is completed. The feed rolls 79 and 80, again being stopped, and the feed carriage 27 being again moved angularly, as a result of the main shaft torque now being transferred to the countershaft 67, the second radius is completed and turning of the feed carriage 27 stopped, when the switch cam 162 comes into engagement with and opens the limit switch 135. Simultaneously, the detent 124a is engaged by the lock roller 129. As will now be evident, the result will be to again drive the feed rolls 79 and 80 to eject the completed work 20 from the exit end of the plate 28. As the trailing end of the work leaves the switch 132, (FIG. 11) the switch member 141 closes on the contact 132a to close the circuit to the solenoid 138 through the limit switch 133. As a result, the feed rolls 79 and 80 are again de-activated while the feed carriage 27 reverses its direction and is returned to its starting position of FIGURE 7. When the feed carriage 27 reaches its starting position, the switch cam 160 simultaneously completes one revolution from its starting point to open the switch 133 whereby the countershaft 67 is de-activated and the feed rolls 79 and 80 are reactivated in readiness for the next workpieces 20.

While a presently preferred embodiment of my invention has been shown and described, it will be apparent to those skilled in the art that modifications may be made therein without departing from the broad scope of the invention. Consequently, I do not wish to be restricted to the particular form or arrangement of parts herein described and shown, except as limited by the following claims.

I claim:
1. In a work feeding device for contour cutting of workpieces by a tool operating in a fixed zone, the combination comprising:
   a feed carriage that is mounted for pivotal movement on an axis offset from the tool zone;
   linear feed means carried by said carriage for moving a workpiece linearly across said carriage and so spaced with respect to the axis of said carriage that a workpiece engaged by said means is moved angularly through the tool zone in response to pivotal movement of said carriage and is linearly movable through the tool zone in response to actuation of said means when said means are in an arrested predetermined angular position relative to the tool zone;
   and a power means that is alternately drivingly engageable with either of said feed carriage or said linear feed means and is adapted for sequentially effecting pivoting of said carriage to feed the workpiece angularly into the tool zone or for actuating said linear feed means when said means are in an arrested predetermined angular position relative to the tool zone to feed the workpiece linearly into the tool zone.

2. A work feeding device as in claim 1 in which said feed carriage carries a first control means to effect disengagement of said power means from said linear feed means and to effect engagement of said power means to said feed carriage,
said control means being positioned at a predetermined location with respect to the path of linear movement of the workpiece and functionally interposed across said path to be energized by an end of the workpiece.

3. A work feeding device as in claim 1 in which a second control means effects disengagement of said power means from said feed carriage and effects engagement of said power means to said linear feed means,
said second control means being interconnected with said feed carriage and adapted to be actuated to effect such power transfer from said feed carriage to said linear feed means after rotation of said feed carriage through a predetermined arc.

4. A work feeding device for contour cutting of workpieces by a tool operating in a fixed zone comprising:
   a carriage support;
   a feed carriage movably mounted on said support and constrained for angular movement by said support;
   linear feed means mounted on said carriage for co-movement with said carriage to be moved by said carriage for moving the workpiece in an arcuate path through the tool zone,
   said feed means being adapted to restrain a workpiece to linear movement with respect to said feed carriage and including feed roll means drivingly engageable with a workpiece to linearly advance the workpiece with respect to said feed carriage;
   and power transmission means drivingly connected to both said feed roll means and said feed carriage to feed a workpiece linearly or in an arcuate path into the tool zone and including clutch means that is operable to actuate said feed roll means and feed carriage alternately.

5. A work feeding device as in claim 4 in which an indexing means is connected to said feed carriage for yieldably retaining said feed carriage and linear feed means in a plurality of angular positions with respect to the tool zone when said power transmission means is drivingly connected to said feed roll means by said clutch means,
said indexing means being interconnected with said transmission means and adapted to yield whenever said transmission means is connected to said feed carriage to permit angular movement of said feed carriage to another angularly indexed position.

6. A work feeding device as in claim 4 in which a second clutch means to substantially prevent turning of said feed roll means in a reverse direction is interposed in a portion of said transmission means for driving said feed roll means to prevent reverse linear movement of a workpiece when said feed roll means is inactive during angular movement of said carriage.

7. A work feeding device as in claim 4 in which a power means is provided for shifting said clutch means for alternately actuating said feed roll means and said feed carriage,
and a control means is provided for actuating said power means, said control means comprising a member mounted on said carriage in the path of linear movement of a workpiece advanced by said feed roll means to be displaced by contact with a workpiece and means responsive to such displacement to actuate said power means in a direction to shift said clutch means for actuating said carriage,
said control means also comprising a rotatable member mounted to be rotated concurrently with angular movement of said carriage and a relatively stationary member positioned to be contacted by said rotatable member after said rotatable member has been swung through a predetermined arc,
and means responsive to contact of said rotatable member and stationary member to actuate said power means in a direction to shift said clutch means for actuating said feed roll means.

8. A work feeding device as in claim 7 in which:
said power means comprises a spring-biased solenoid mechanism having a spring means normally biasing said solenoid in a direction to shift said clutch means for actuating said feed roll means,
and in which said means responsive to displacement comprises a normally open switch in a circuit including said solenoid that is closed by said displacement to energize said solenoid, said relatively stationary member being operatively connected to a normally closed switch in said circuit that is opened by said contact with said rotatable member to de-energize said solenoid.

9. A work feeding device as in claim 8 in which:
an indexing plate is mounted coaxially with said rotatable member and is drivably interconnected to a portion of said transmission means for actuating said carriage,
and a locking lever is pivotally mounted adjacent said indexing plate and is biased into yieldable engagement with the periphery of said plate,
said plate and lever having cooperating detent means adapted to prevent angular movement of said carriage when said feed roll means is actuated and adapted to yieldably disengage when said carriage is actuated with consequent co-rotation of said indexing plate and said rotatable member,
said detent means being adapted for engagement substantially concurrently with contact of said stationary member by said rotatable member.

10. A work feeding device for contour cutting of workpieces by a tool operating in a fixed zone comprising:
a carriage support;
a horizontally disposed feed carriage pivotally mounted on top of said carriage support for angular reciprocation on a pivot axis offset from the tool zone;
a plurality of pressure rolls mounted on top of said feed carriage for rotation on vertical axes spaced apart longitudinally with respect to the path of a workpiece to be advanced over the surface of said feed carriage for cutting;
a plurality of feed rolls rotatably mounted on top of said feed carriage for rotation on vertical axes that are spaced apart longitudinally with respect to the path of a workpiece over said feed carriage,
said pressure rolls and said feed rolls being disposed on opposite sides of said path and each of said feed rolls being in substantially confronting relationship to one of said pressure rolls;
a linkage means including a crank and interconnected to said feed carriage, said linkage means being adapted to translate rotary motion of said crank into angular reciprocation of said feed carriage whereby the surface area of said feed carriage between said pressure rolls and feed rolls is arcuately reciprocated through the cutting zone;
chain and sprocket means drivingly interconnected to said feed rolls whereby to linearly advance a workpiece between said feed rolls and said pressure rolls;
and a main power means drivingly connected to both said chain and sprocket means and said linkage means and including clutch means that is operable to alternately actuate said feed rolls or to angularly move said feed carriage.

11. A work feeding device as in claim 10 in which:
said pressure rolls are mounted for limited slidable movement toward and away from said feed rolls and in which a spring means is provided to normally bias said pressure rolls toward said feed rolls and into the path of a workpiece advancing over the surface of said feed carriage,
said spring means being centrally disposed between an adjacent pair of said pressure rolls whereby adjacent ones of said pressure rolls may yield differentially in being displaced by a workpiece.

12. A work feeding device as in claim 10 in which:
the pivotal interconnection of said feed carriage and said support plate angularly adjustably supports a tubular sleeve having a bore formed therethrough with an axis related eccentrically to the rotational axis of said sleeve,
said sleeve mounting a rotatable shaft keyed to a sprocket mounting a chain for driving said feed rollers,
said sleeve being angularly adjustable whereby to adjust the tension of said chain.

13. A work feeding device as in claim 12 in which:
an elongated feed plate is secured on top of said feed carriage to extend between said pressure rolls and said feed rolls, said feed plate having an edge closely confronted by an edge of a feed roll mechanism supporting said feed rolls,
said feed roll mechanism being adjustably affixed to a coaxial extension of said eccentrically disposed shaft, the connection between said feed roll mechanism and said extension being releasable to permit eccentric movement of said extension and shaft without movement of said feed roll mechanism,
said extension including a unidirectionally acting clutch means rotatably engaged by said shaft when said shaft is rotating in a direction to drive said feed rolls in a direction to advance a workpiece into the work zone, said clutch means being secured to said feed roll mechanism whereby said confronting edges of said feed plate and feed roll mechanism react and said clutch means reacts to unidirectionally prevent rotation of said shaft and feed rolls in a reverse direction.

14. A work feeding device as set forth in claim 10 in which:
said power transmission means includes a main power shaft idly mounting a feed clutch for actuating said feed rolls and idly mounting an index clutch for actuating said linkage system, said main power shaft having a shift clutch drivingly keyed thereto and axially shiftable on said main power shaft for alternate engagement with said feed clutch and said index clutch.

15. A work feeding device as in claim 14 in which:
a spring-biased solenoid is drivingly connected to said shift clutch for effecting alternate engagement with said index clutch and feed clutch,
said solenoid being normally spring-biased to drive said shift clutch into driving engagement with said feed clutch and, when energized, serving to drive said shift clutch into engagement with said index clutch.

References Cited

UNITED STATES PATENTS

| | | | |
|---|---|---|---|
| 688,871 | 12/1901 | Mershon | 144—247 XR |
| 2,664,923 | 1/1954 | Ferrari | 144—242 XR |
| 2,736,349 | 2/1956 | Francis. | |
| 2,754,858 | 7/1956 | Davis. | |

WILLIAM W. DYER, Jr., *Primary Examiner.*

W. D. BRAY, *Assistant Examiner.*